United States Patent
Driscoll

[15] 3,661,519
[45] May 9, 1972

[54] HYDROLYSIS OF SILICON TETRAFLUORIDE

[72] Inventor: Richard E. Driscoll, Monroe, La.
[73] Assignee: Cities Service Company, New York, N.Y.
[22] Filed: July 1, 1970
[21] Appl. No.: 51,622

[52] U.S. Cl. ..................................23/182 V, 23/1 B, 23/153, 23/182 P
[51] Int. Cl. ....................................C01b 33/18, C01b 33/14
[58] Field of Search.....................23/182 V, 182, 202 V, 1 R, 23/1 B, 153

[56] References Cited

UNITED STATES PATENTS

| | | | |
|---|---|---|---|
| 2,819,151 | 1/1958 | Flemmert | 23/182 V |
| 3,086,851 | 4/1963 | Wagner | 23/202 V X |
| 3,130,008 | 4/1964 | Stokes et al. | 23/182 V X |
| 3,203,759 | 8/1965 | Flemmert | 23/182 V |
| 3,233,969 | 2/1966 | Heller | 23/182 |

Primary Examiner—Edward Stern
Attorney—J. Richard Geaman

[57] ABSTRACT

A mixture comprising oxygen, a hydrocarbon fuel and silicon tetrafluoride is burned, the amount of oxygen in the mixture being insufficient for complete combustion of the fuel. A substantial portion of the silicon tetrafluoride is hydrolyzed within the resulting incomplete-combustion hydrocarbon flame, oxygen being added thereafter for combustion of the remaining fuel therein. Probably because of free radical initiation in the incomplete-combustion flame, the conversion efficiency of silicon tetrafluoride to silica can be maintained at high levels while temperatures remain below the fusion-sintering point of the silica, i.e., not in excess of about 1,600° F.

9 Claims, 2 Drawing Figures

PATENTED MAY 9 1972 3,661,519

SiF4 + H2O

AIR + FUEL GAS

SECONDARY AIR

COOLING AIR

Fig. 1

SILICA AEROSOL

INVENTOR.
RICHARD E. DRISCOLL
BY
ATTORNEY

HYDROLYSIS OF SILICON TETRAFLUORIDE

BACKGROUND OF THE INVENTION

The present invention pertains to manufacture of amorphous, pigmentary silicon dioxide which is produced by hydrolysis of silicon tetrafluoride at elevated temperatures, e.g., in excess of about 1,100° F. The most widely utilized technique for achieving the hydrolysis has been flame processes wherein a fluid fuel is burned with a free-oxygen containing gas in the presence of the silicon tetrafluoride, water for the reaction being supplied by combustion of the fuel or from an external source. The resulting silicas generally have a particle size within the range of about 5–50 millimicrons and a surface area within the range of about 75–200 square meters per gram. After formation, the silica is separated by filtration from gaseous products of the reaction, e.g., hydrogen fluoride, water vapor and $CO_2$, and is recovered as a dry, low density powder. Among other uses, such silicas can be employed as reinforcing agents for silicone rubber, as thickeners for resins and greases, and as anticaking agents.

U.S. Pat. No. 2,631,083 discloses that the hydrolysis of silicon tetrafluoride will proceed 80 percent to completion at 1,500° F. while temperatures in excess of 1,800° F. are required for substantially complete hydrolysis, e.g., in excess of 90 percent. However, the aforesaid disclosure fails to indicate that prohibitively long reaction times are required to achieve conversion efficiencies over 50 percent when the reaction temperature is below about 1,600° F. As a consequence the art has developed around flame processes wherein the flame has a "high intensity"; or, more generally, a temperature of at least 1,800° F. and commonly in excess of 2,000° F. Thus, operating techniques have been developed which effect substantially complete combustion of the fuel in the flame in the shortest possible length of time since this assures rapid and highly efficient conversion of the silicon tetrafluoride to silica.

Flame processes for manufacturing silica from silicon tetrafluoride have nonetheless been plagued by fusion or sintering of the micro-particles which occurs at temperatures of about 1,600° F. and higher and which is sometimes observed at temperatures as low as about 1,450° F. Temperatures above the fusion-sintering point can result in considerable lowering of the surface area of the silica unless the particles are quenched rapidly enough. A more serious problem has been the formation of accretions on the walls of the hydrolysis chamber, i.e., the hot silica particles stick to the wall and to each other and quickly form deposits which alter mixing and flow patterns of the reactants and which will eventually plug up the chamber unless they are cleaned out fairly frequently. Not only does the clean-out procedure require shutdown of the process, but a considerable proportion of the silica product is lost to these deposits, which are worthless, since they cannot be reconverted to useful pigmentary silica by pulvarization or grinding.

The need has persisted, therefore, for a flame process wherein the conversion of silicon tetrafluoride to silica can be carried out at high efficiency levels while employing hydrolysis temperatures which are below the sintering-fusion point of the silica being produced.

SUMMARY OF THE INVENTION

It is therefore an object of this invention to provide a flame process wherein high yields of silica are achieved by the hydrolysis of silicon tetrafluoride at temperatures which avoid sintering and fusion of the silica. Other objects and advantages of the invention will become apparent from the following description thereof and the appended claims.

In accordance with the present invention a mixture is burned which comprises oxygen, a hydrocarbon fuel gas and silicon tetrafluoride, the amount of oxygen in said mixture being insufficient for substantially complete combustion of the fuel. The silicon tetrafluoride is substantially hydrolyzed within the incomplete-combustion flame which results from burning of the mixture. Thereafter, more oxygen is added to the flame for burning of the combustible fuel components which remain therein, e.g., carbon monoxide, hydrogen, aldehydes, etc.

In addition to oxygen, fuel, and silicon tetrafluoride, the hydrolysis reaction mixture can comprise extraneously supplied water vapor and inert gases such as nitrogen and hydrogen fluoride. In any case the components of the mixture can be proportioned so that upon substantially complete ignition of the fuel, flame temperatures do not exceed about 1,600° F.

An essential feature of the invention is substantial hydrolysis of the silicon tetrafluoride in a region of the flame wherein combustion of the hydrocarbon fuel is substantially incomplete, since this step is necessary to the achievement of high yields of silica at a relatively low hydrolysis temperature. Although not wishing to be bound by theory, it is felt that free radicals—especially hydroxyl—which are liberated in the flame are highly reactive with the silicon tetrafluoride, thus achieving what can only be accomplished with water at the higher temperatures required for sufficient dissociation thereof. By means of the present invention the hydrolysis of silicon tetrafluoride can, therefore, be carried out at temperatures within the range of about 1,200°–1,600° F. while achieving conversion efficiencies of 90 percent and higher. To advantage, the hydrolysis temperatures can be maintained within the range of about 1,200° F. to about 1,400° F. to provide an increased margin of safety against fusion and sintering of the silica.

Any suitable fluid hydrocarbon fuel can be employed for forming the hydrolysis reaction mixture, but normally gaseous hydrocarbons can be employed to advantage, i.e., methane, ethane, propane, butane or mixtures thereof. Since hydrogen can also be employed in the practice of the invention, it will be understood that the term "hydrocarbon fuel gas" as used herein is intended to mean hydrogen as well as mixtures thereof with other hydrocarbon fuels. Oxygen may be supplied to the hydrolysis reaction mixture as substantially pure oxygen, air, air enriched with oxygen, or any other suitable free oxygen-containing gas.

As previously indicated the flame in which the hydrolysis takes place is characterized by a first region in which the proportion of fuel and oxygen is such that combustion of the fuel is substantially incomplete, and a second region wherein further mixing and combustion with oxygen occurs. The proportion of oxygen to fuel which can exist in the first region for incomplete combustion of the fuel is subject to considerable variation, but the fuel should be in excess to the extent that the stoichiometric fraction, $\phi$, is at least about 1.3 where:

$$\phi = \frac{\text{Volume percent of fuel gas in actual mixture (V.F.G.)}}{\text{Stoichiometric fuel gas, volume percent (S.F.G.)}}$$

To particular advantage of the stoichiometric fraction, $\phi$, can be within the range of about 1.5 to about 1.8.

After partial combustion of the fuel and substantial hydrolysis of the silicon tetrafluoride within the incomplete combustion flame, oxygen is added to the flame in an amount which is sufficient for substantially complete ignition of unburned fuel constituents which remain therein. Some excess oxygen can be added where it is preferable and practical to do so. Accordingly, the total amounts of fuel and oxygen which are fed to the entire flame will generally be in a proportion such that $\phi$ is 1.0 or less, i.e., stoichiometric or lean in fuel.

While it is desirable to maintain the hydrolysis temperatures below about 1,600° F., the amount of fuel which is burned for hydrolysis of any given amount of silicon tetrafluoride is nonetheless subject to considerable variation, since more or less heat may be required for heating up variable amounts of water vapor and inert gases which can be incorporated into the hydrolysis reaction mixture, the actual amounts of these constituents being dependent, among other things, upon the manner in which the silicon tetrafluoride is generated and the amount of nitrogen, etc., in mixture with the oxygen stream.

Air, for instance, can be conveniently employed for combustion of the hydrocarbon fuel, and the silicon tetrafluoride can be in mixture water vapor prior to incorporation into the hydrolysis mixture.

In the present invention, the concentration of silicon tetrafluoride in the reaction mixture can be varied for the purpose of regulating the surface area of the silica being produced, this being the subject of another invention which is described in my copending patent application Ser. No. 51,632 filed July 1, 1970. By means of the process disclosed therein, the concentration of silicon tetrafluoride in the hydrolysis mixture is established at a selected value which corresponds in direct proportion to the surface area desired of the silica product, i.e., the surface area of the silica is increased by raising the concentration of silicon tetrafluoride in the hydrolysis mixture, and vice versa. Accordingly, the constituents which are formed into the reaction mixture can be proportioned to provide a preselected mass ratio of flame reactants and diluents to silicon tetrafluoride which is within the range of about 10 to about 110, thereby permitting the formation of silicas having a particle size of about 5 to about 15 millimicrons and a specifically desired surface area (B.E.T.) within the range of about 200 to about 500 m $^2$/gm. Flame reactants are the hydrocarbon fuel and oxygen, while diluents include water vapor, hydrogen fluoride and nitrogen, the latter being introduceable as air whereby oxygen is also supplied for combustion of the fuel. To advantage, the silicon tetrafluoride can be passed into the hydrolysis zone while mixed with a preselected amount of a diluent vapor, thus providing a means for regulating the concentration of silicon tetrafluoride in the mixture while maintaining a constant feed rate of the reactants thereto. Suitable diluents for this purpose include water vapor, hydrogen fluoride, inert gases, and mixtures thereof. When using air to supply oxygen to the flame, the content of silicon tetrafluoride and diluent vapor in the mixture can be proportioned to provide a specific mol fraction of silicon tetrafluoride therein which is within the range of about 0.02 to about 0.14. Accordingly, a specific concentration of silicon tetrafluoride in the reaction mixture can be established whereby the silica product has a surface area that is specifically desired.

Hydrolysis of the silicon tetrafluoride in accordance with the invention results in formation of an aerosol of the silica suspended in flame gases and hydrogen fluoride. The silica is then separated and recovered from these gases by means of known techniques, e.g., after cooling, the aerosol is passed into a bag filter wherein the silica is separated at a temperature of about 450°–500° F.

BRIEF DESCRIPTION OF THE DRAWING

FIG. 1 is a horizontal view, in section, of a hydrolysis reactor which can be used in the practice of the invention.

DESCRIPTION OF PREFERRED EMBODIMENTS

Figure 2:
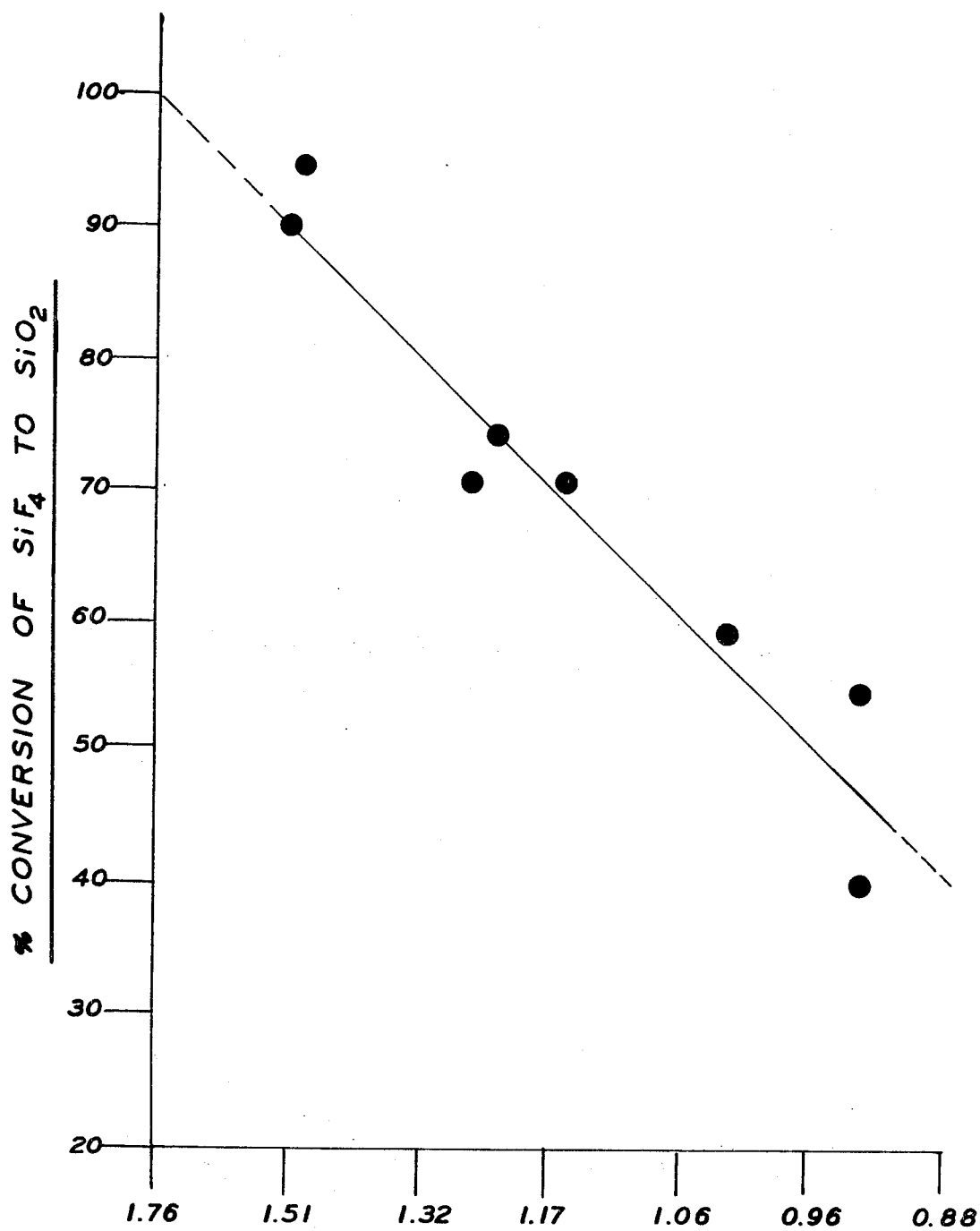
FIG. 2 is a graphical presentation of silica yield versus $\phi$ of the incomplete-combustion flame when hydrolyzing silicon tetrafluoride during one embodiment of the invention.

With reference to FIG. 1, a hydrolysis chamber 1 is enclosed by a metal wall 2 having tapered inlet and outlet ends represented at 3 and 4, respectively. A burner for forming the incomplete combustion flame is generally represented at 5. The burner comprises a barrel 6 with a somewhat enlarged discharge end which contains a refractory flame-stabilizer ring 7. A mixture of air and hydrocarbon fuel gas is fed to the burner barrel 6 through conduit 8 while a mixture of silicon tetrafluoride and water vapor is introduced axially through conduit 9. The resultant mixture of air, fuel, silicon tetrafluoride and water vapor is ignited at the discharge end of the burner and burns as a flame which is generally represented at 10. Secondary air, for combustion of the fuel components which reside in the flame after burning of the fuel-rich hydrolysis mixture, is introduced tangentially into a burner shroud 11 through conduit 12. A silica aerosol thus forms in chamber 1 by hydrolysis of the silicon tetrafluoride. The aerosol is removed from the chamber through conduit 13 and is conveyed therein to cooling and collection units for recovery of the silica. The metal wall 2 of the hydrolysis chamber is provided with a cooling jacket 14 into which cooling air is introduced through conduit 15, and is removed therefrom through conduit 16.

In operation, a fuel-rich mixture of air and fuel gas, i.e., whereby $\phi$ is at least about 1.3, is introduced into the burner through conduit 8 at a constant rate. At the same time, a mixture of silicon tetrafluoride and water vapor is fed to the burner through conduit 9. Advantageously, the silicon tetrafluoride and water can be proportioned in the mixture to provide a selected mol fraction of silicon tetrafluoride which is within the range of about 0.02 to 0.15 for control of the surface area of the silica. A fuel supply rate is selected which will provide a temperature of not in excess of about 1,600° F. in the hydrolysis flame.

The hydrolysis reaction mixture, being rich in fuel, burns as a relatively cool elongated flame along the center-line of the hydrolysis chamber. Since, however, the secondary air is introduced in a manner so that it surrounds the flame rather than being quickly and forcefully mixed with it, substantially complete hydrolysis of the silicon tetrafluoride occurs in a region of the flame wherein combustion of the fuel is substantially incomplete. As a consequence, unburned fuel is subjected within this region to thermal cracking and/or only partial reaction with oxygen whereby free radicals are formed which survive long enough for reaction in a manner which does not exist in a hot, fast flame, thus effecting high yields of silica at unusually low temperatures. The temperature within the region of the flame wherein incomplete combustion and substantial hydrolysis occurs may, for instance, be within the range of only about 1,200°–1,400° F., whereas the temperature may increase to 1,600° F. in the region wherein combustion of the fuel is completed by the addition of oxygen.

Mixtures of silicon tetrafluoride and water vapor for incorporation into the hydrolysis reaction mixture may be produced in any suitable manner. Such mixtures are stable within the range of just above dew point to about 600° F. The mixture may be produced, for instance, by the vaporization of hydrofluosilicic acid, but more advantageously the processes as described in U.S. Pat. Nos. 3,233,969 or 3,273,963 can be employed. It will be understood, nonetheless, that substantially dry silicon tetrafluoride can also be utilized in the invention, and can be produced, for instance, by reacting hydrogen fluoride with silica in a polyhydric alcohol bath. Such a process is described in U.S. Pat. No. 2,891,872.

EXAMPLE

Using a hydrolysis reactor substantially as shown in FIG. 1, eight experiments were run at fixed conditions except that the ratio of air to fuel gas introduced into the burner through conduit 8 was varied to provide values of $\phi$ within the range of about 0.95 to about 1.5 in the incomplete combustion flame. To produce the mixture of silicon tetrafluoride that was fed to the burner through conduit 9, 30 percent hydrofluoric acid was vaporized at the rate of 30 lbs./hr. and the resultant vapor was passed over a bed of silica pebbles maintained at 250° F. to provide silicon tetrafluoride in mixture with water vapor and a little HF, i.e., conversion of the HF to silicon tetrafluoride was 90 percent efficient. The composition of the resulting feed stream, which entered the burner through conduit 9, is shown in Table I.

TABLE I

| Constituent | Pounds/hour | Mols/hour | Mol Fraction |
|---|---|---|---|
| $SiF_4$ | 10.52 | 0.1011 | 0.0667 |
| $H_2O$ | 24.62 | 1.3688 | 0.9035 |

| | | | |
|---|---|---|---|
| III | 0.90 | 0.450 | 0.0297 |

Natural gas, in mixture with varied amounts of air, was fed to the burner at the rate of 250 SCFH through conduit 8, this mixture being preheated to 350 F. Secondary air, also preheated to 350° F., was fed to the hydrolysis chamber through conduit 12 at rates to establish an overall ratio of air to fuel of 12/1, the theoretical stoichiometric ratio being about 9.6/1. In each experiment the total air input to the hydrolysis zone was maintained at 3,000 SCFH.

The composition of the air-fuel mixtures introduced into the burner through conduit 8 is shown in Table II. In Experiments 3-8 these mixtures provided an incomplete combustion flame in which substantial hydrolysis of the silicon tetrafluoride occured. Yield values for each experiment are also shown.

TABLE II

| Exp. | Air, SCFH | Fuel, SCFH | Air Fuel | $\phi$ | %SiF$_4$ to SiO$_2$ |
|---|---|---|---|---|---|
| 1 | 2600 | 250 | 10.4/1 | 0.93 | 40.6 |
| 2 | 2600 | 250 | 10.4/1 | 0.93 | 54.3 |
| 3 | 2350 | 250 | 9.4/1 | 1.02 | 59.0 |
| 4 | 2030 | 250 | 8.1/1 | 1.16 | 70.6 |
| 5 | 1900 | 250 | 7.6/1 | 1.23 | 74.0 |
| 6 | 1850 | 250 | 7.4/1 | 1.26 | 70.4 |
| 7 | 1525 | 250 | 6.1/1 | 1.49 | 95.0 |
| 8 | 1500 | 250 | 6.0/1 | 1.51 | 90.0 |

A graphical representation of the yield value of silica versus $\phi$ for these experiments is shown in FIG. 2. It is apparent therefrom that yield values did not exceed about 50 percent when $\phi$ for the oxygen-fuel gas mixture of the incomplete-combustion flame was lower than 1.0. For yield values in excess of 80 percent, $\phi$ exceeded about 1.3.

The following example is given for calculating $\phi$, using a stoichiometric mixture of methane in air for the purpose of illustration, 9.56 volume units of air being required for combustion of one volume unit of methane.

$$\phi = \frac{\text{Volume percent fuel gas in actual mixture (V.F.G.)}}{\text{Stoichiometric fuel gas, volume percent (S.F.G.)}}$$

$$\text{S.F.G.} = \frac{1.0}{10.56} = 0.0946$$

$$\text{V.F.G.} = \frac{1.0}{10.56} = 0.0946$$

$$\therefore = \frac{0.0946}{0.0946} = 1.00$$

As can be determined from this example, fuel mixtures wherein $\phi$ is less than 1 are lean in fuel whereas they are rich in fuel when $\phi$ is in excess of 1.

During each of the aforegoing experiments, the temperature of the hydrolysis flame did not exceed about 1,600° F. The resulting silica aerosols were passed into a bag filter wherein the silica was separated from the gases at about 450° F. Each of the silicas was examined and found to have a particle size of about 9 millimicrons and s surface area of 300 square meters per gram. No fused accretions of the silica were found in the hydrolysis chamber after the experiments were completed.

This invention has been described with reference to particular apparatus, conditions, proportions and the like, but it will be understood that various changes and modifications can be made which are within the spirit and scope of the invention as is defined in the following claims.

Therefore, what is claimed is:

1. A process for producing pigmentary silica having a particle size within the range of about 5 to about 15 millimicrons and a surface area within the range of about 200 m²/gm. to about 500 m²/gm. by hydrolysis of silicon tetrafluoride in hot flame gases produced by combustion of a hydrocarbon fuel with oxygen which comprises:

a. burning a mixture comprising oxygen, a hydrocarbon fuel gas and silicon tetrafluoride, wherein said fuel is in excess with respect to said oxygen to the extent that the stoichiometric fraction, $\phi$, is at least about 1.3 where:

$$\phi = \frac{\left[\begin{array}{c}\text{Volume percent of fuel gas}\\ \text{actually in mixture (V.F.G.)}\end{array}\right]}{\left[\begin{array}{c}\text{Stoichiometric amount of fuel}\\ \text{gas, Volume percent (S.F.G.)}\end{array}\right]}$$

b. substantially hydrolyzing said silicon tetrafluoride within the incomplete-combustion flame which results from the burning of said mixture, c. thereafter adding oxygen to said flame and substantially completely burning combustible fuel constituents which remain therein, and whereupon substantially complete ignition of said fuel the flame temperature does not exceed about 1,600° F., and wherein said silicon tetrafluoride is hydrolyzed at a temperature within the range of about 1,200° F. to about 1,600° F., d. thereafter recovering silica from the resulting aerosol.

2. The process of claim 1 wherein the flame temperature is within the range of about 1,200°–1,400° F.

3. The process of claim 1 wherein the fuel gas is selected from the group consisting of methane, ethane, propane, butane, hydrogen and mixtures thereof.

4. The process of claim 1 wherein the oxygen that is supplied to the mixture that is burned is furnished thereto as a gas selected from the group consisting of substantially pure oxygen, air, and air enriched with oxygen.

5. The process of claim 1 wherein the mass ratio of flame reactants and diluents to silicon tetrafluoride which are formed into the hydrolysis mixture is within the range of about 10 to about 110.

6. The process of claim 1 wherein oxygen is supplied to the hydrolysis mixture in the form of air while silicon tetrafluoride is supplied thereto in mixture with a diluent vapor.

7. The process of claim 6 wherein the diluent vapor comprises water vapor.

8. The process of claim 6 wherein the mol fraction of silicon tetrafluoride in the diluted mixture is within the range of about 0.02 to about 0.14.

9. The process of claim 1 wherein the stoichiometric fraction, $\phi$, is within the range of about 1.5 to about 1.8.

* * * * *